United States Patent [19]
Markowicz et al.

[11] Patent Number: 5,938,200
[45] Date of Patent: *Aug. 17, 1999

[54] WAGERING GAME OF CHANCE

[75] Inventors: Victor Markowicz, Englewood, N.J.; John Leo Cadigan, Hudson, Mass.; Robert C. Angell, West Greenwich, R.I.

[73] Assignee: GameScape, Inc., Coventry, R.I.

[*] Notice: This patent issued on a continued prosecution application filed under 37 CFR 1.53(d), and is subject to the twenty year patent term provisions of 35 U.S.C. 154(a)(2).

[21] Appl. No.: 08/844,764

[22] Filed: Apr. 22, 1997

[51] Int. Cl.$^6$ ........................................... A63F 3/00
[52] U.S. Cl. ................ 273/246; 273/138.2; 273/139; 463/6; 463/16
[58] Field of Search ................ 463/1, 6, 16, 25, 463/29, 30–31, 36, 40–42; 273/139, 138.2, 138.1, 246; 364/410.1, 412.1

[56] References Cited

U.S. PATENT DOCUMENTS

| | | | |
|---|---|---|---|
| 3,560,127 | 2/1971 | Imperato | 273/246 |
| 3,770,271 | 11/1973 | Kim | 273/86 R |
| 4,036,492 | 7/1977 | Breslow | 273/1 R |
| 4,060,246 | 11/1977 | Ward | 273/135 |
| 4,288,077 | 9/1981 | Rose et al. | 273/246 |
| 4,795,161 | 1/1989 | Chao | 273/292 |
| 4,874,177 | 10/1989 | Girardin | 273/246 |
| 5,186,460 | 2/1993 | Fongeallaz et al. | 273/86 B |
| 5,320,351 | 6/1994 | Suzuki | 273/86 |
| 5,326,104 | 7/1994 | Pease et al. | 273/138 A |
| 5,398,938 | 3/1995 | Money | 273/246 |
| 5,560,603 | 10/1996 | Seelig et al. | 463/6 |
| 5,564,977 | 10/1996 | Algie | 463/25 |
| 5,591,081 | 1/1997 | Suzuki | 463/13 |
| 5,664,998 | 9/1997 | Seelig et al. | 463/20 |

*Primary Examiner*—Jessica J. Harrison
*Assistant Examiner*—Mark A. Sager
*Attorney, Agent, or Firm*—Fish & RIchardson P.C.

[57] ABSTRACT

A game of chance and a method for playing the game involve a plurality of distinct game participants. A plurality of drawing elements correspond to each one of the game participants, the plurality of drawing elements being the same in number for each one of the game participants. A selection device randomly selects drawing elements from among all of the plurality of drawing elements corresponding to all of the plurality of game participants one at a time during the game, each drawing element capable of being selected only once during the game. There is a termination point toward which a game participant progresses when one of the plurality of drawing elements corresponding to the game participant is selected by the selection device. The game participant reaches the termination point when a sufficient quantity of the plurality of drawing elements corresponding to the game participant has been selected.

23 Claims, 6 Drawing Sheets

FIG. 3

| WAGER | GAME |
|---|---|
| PLAYER GUESSES FIRST PLACE GAME PARTICIPANT ("WIN") | SINGLE |
| PLAYER GUESSES SECOND PLACE GAME PARTICIPANT ("PLACE") | SINGLE |
| PLAYER GUESSES THIRD PLACE GAME PARTICIPANT ("SHOW") | SINGLE |
| PLAYER GUESSES FIRST, SECOND AND THIRD PLACE GAME PARTICIPANTS IN CORRECT ORDER | SINGLE |
| PLAYER GUESSES FIRST, SECOND AND THIRD GAME PARTICIPANTS TO FINISH, INDEPENDENT OF ORDER | SINGLE |
| PLAYER GUESSES FIRST PLACE GAME PARTICIPANT IN THE NEXT X GAMES | MULTIPLE, WHERE X IS A NATURAL NUMBER |
| PLAYER GUESSES THAT A PARTICULAR GAME PARTICIPANT WILL FINISH FIRST, SECOND OR THIRD IN THE NEXT X GAMES | MULTIPLE, WHERE X IS A NATURAL NUMBER |
| PLAYER GUESSES THAT A PARTICULAR GAME PARTICIPANT WILL FINISH IN FEWER THAN 15 DRAWS | SINGLE |
| PLAYER GUESSES THAT ANY GAME PARTICIPANT WILL FINISH IN FEWER THAN 15 DRAWS | SINGLE |

FIG. 5

FIRST PLACE PAYOUTS PER $1 WAGERED
CURRENT DRAW COUNT : 5

| NUMBER OF DRAWS | WHITE CAR | RED CAR | GREEN CAR | BLUE CAR | BROWN CAR |
|---|---|---|---|---|---|
| LESS THAN 10 | 500 | 300 | 1000 | 800 | 2000 |
| 11 TO 14 | 200 | 100 | 500 | 400 | 1000 |
| 15 TO 19 | 100 | 50 | 250 | 200 | 500 |
| 20 TO 25 | 50 | 25 | 125 | 100 | 250 |

WAGERING GAME OF CHANCE

BACKGROUND OF THE INVENTION

This invention relates to a wagering game of chance, and in particular, a game in which game participants advance on the basis of a drawing of randomly selected elements.

In a typical lottery-type game, the components of a winning combination of game pieces are randomly selected. Since the random selection of components in a lottery-type game occurs in a linear fashion, players are rapidly excluded during play of the game from winning the top prize awarded for matching all or most of the components selected. In such a lottery-type game, the odds of a particular player winning the top prize are usually low, while the payouts to a small number of winning players may be large.

In a typical keno-type game, more winning components than are needed by a player to win the top prize of the game are randomly selected. Thus, a player can lack some quantity of the randomly selected components and still win the top prize. For example, the player may select 10 elements from a field of 80 elements, while 20 elements are drawn from the field of 80 elements as the winning components. In this case, a player may be lacking 10 of the 20 elements selected as winning components and still win the top prize.

Another type of game is a racing game, in which each racing element competes against a clock or timer to reach a finish line. See U.S. Pat. No. 5,560,603. In such a game, all racing elements start at the same specified time. Players usually place bets on which racing element will win the race at the start of the game.

SUMMARY OF THE INVENTION

In general, in one aspect, the invention features a game of chance including a plurality of distinct game participants. A plurality of drawing elements correspond to each one of the game participants, the plurality of drawing elements being the same in number for each one of the game participants. A selection device randomly selects drawing elements from among all of the plurality of drawing elements corresponding to all of the plurality of game participants one at a time during the game, each drawing element capable of being selected only once during the game. There is a termination point toward which a game participant progresses when one of the plurality of drawing elements corresponding to the game participant is selected by the selection device. The game participant reaches the termination point when a sufficient quantity of the plurality of drawing elements corresponding to the game participant has been selected.

Implementations of the invention may also include one or more of the following features. The probability that each game participant will progress toward the termination point as a result of a next random selection of one of the drawing elements may change each time one of the drawing elements is randomly selected by the selection device.

The selection device may be an electronic random number generator or a manual drawing device. The game may include a video display for displaying the game participants and the drawing elements. The video display may display the progress of the game participants toward the termination point during play of the game.

Each game participant and the plurality of drawing elements corresponding to each game participant may be identified by a color, the color for each game participant being distinct. The game participants may be distinguished by color. The game participants may be racing cars.

In general, in another aspect, the invention features a method of playing a game of chance including the provision of a plurality of distinct game participants. A plurality of drawing elements corresponding to each one of the game participants is provided, the plurality of drawing elements being the same in number for each one of the game participants. A drawing element is randomly selected from among all of the plurality of drawing elements for all of the plurality of game participants one at a time during the game, each drawing element capable of being selected only once during the game. A game participant advances toward a termination point when one of the plurality of drawing elements corresponding to the game participant is selected. The game participant reaches the termination point when a sufficient quantity of the plurality of drawing elements corresponding to the game participant has been selected.

Implementations of the invention may also include one or more of the following features. The probability that each game participant will progress toward the termination point as a result of a next random selection of one of the drawing elements may be calculated and displayed.

A wager may be placed with respect to the progress of one or more game participants toward the termination point. The wager may be placed at any time during play of the game. The payout for the wager may be based on the probability that a particular game participant will reach the termination point before the other game participants. The payout for the wager may be based on the probability that the game participants will reach the termination point in a particular order. The payout for the wager may be based on the probability that a particular game participant will reach the termination point before a predetermined number of drawing elements has been randomly selected.

In general, in another aspect, the invention features a system for playing a game of chance. A processor conducts play of the game, in which a plurality of distinct game participants advance toward a termination point. A memory stores a plurality of drawing elements corresponding to each one of the plurality of game participants, the plurality of drawing elements being the same in number for each one of the game participants. A random number generator randomly selects drawing elements stored in the memory one at a time during play of the game, each drawing element capable of being selected only once during the game. A display device displays the game participants as they advance toward the termination point, each game participant advancing toward the termination point when one of the plurality of drawing elements corresponding to the game participant is selected by the random number generator. A game participant reaches the termination point when a sufficient quantity of the plurality of drawing elements corresponding to the game participant has been selected.

Implementations of the invention may also include one or more of the following features. The processor may calculate and the display device may display the probability that each game participant will progress toward the termination point as a result of a next random selection by the random number generator. The system may include a terminal in communication with the processor for placing wagers on the game.

The display device may display payouts associated with the wagers. The display device may display the game participants and the drawing elements. The drawing elements may be displayed as colored blocks in a grid.

The present invention has the advantage that no player is excluded from winning the top prize until the top prize is actually won.

The present invention has the additional advantage that each player has a chance greater than zero of being a winner until the time that the game's winners are actually determined.

The present invention has the additional advantage that the game tends to be a close contest between all of the game's participants until the game is completed.

The present invention has the additional advantage that there is a relatively high probability of winning the game.

The present invention has the additional advantage that players may place wagers at any point during the game.

The present invention has the additional advantage that it appears to be interactive from the point of view of the game's players.

The present invention has the further advantage that wagers on the game participants are simple to place.

Other features and advantages of the invention will become apparent from the following detailed description, and from the claims.

BRIEF DESCRIPTION OF THE DRAWINGS

FIG. 3 is a chart of exemplary wager options for the game of chance of the present invention.

FIG. 5 is a chart of exemplary payouts for the game of chance of the present invention.

DESCRIPTION OF THE PREFERRED EMBODIMENTS

The game of chance of the present invention allows players to place wagers on the outcome of a series of random events. The series of random events form a contest or race which produces at least one winning game participant. All outcomes of the events are strictly random occurrences. Past performance, strategy, environmental conditions, player skill and wagering activity have no impact on the outcomes. Thus, the game of chance of the present invention satisfies the requirements of a lottery game; i.e. a game that provides equal odds to all players without requiring specific knowledge or skill.

Figure 1:
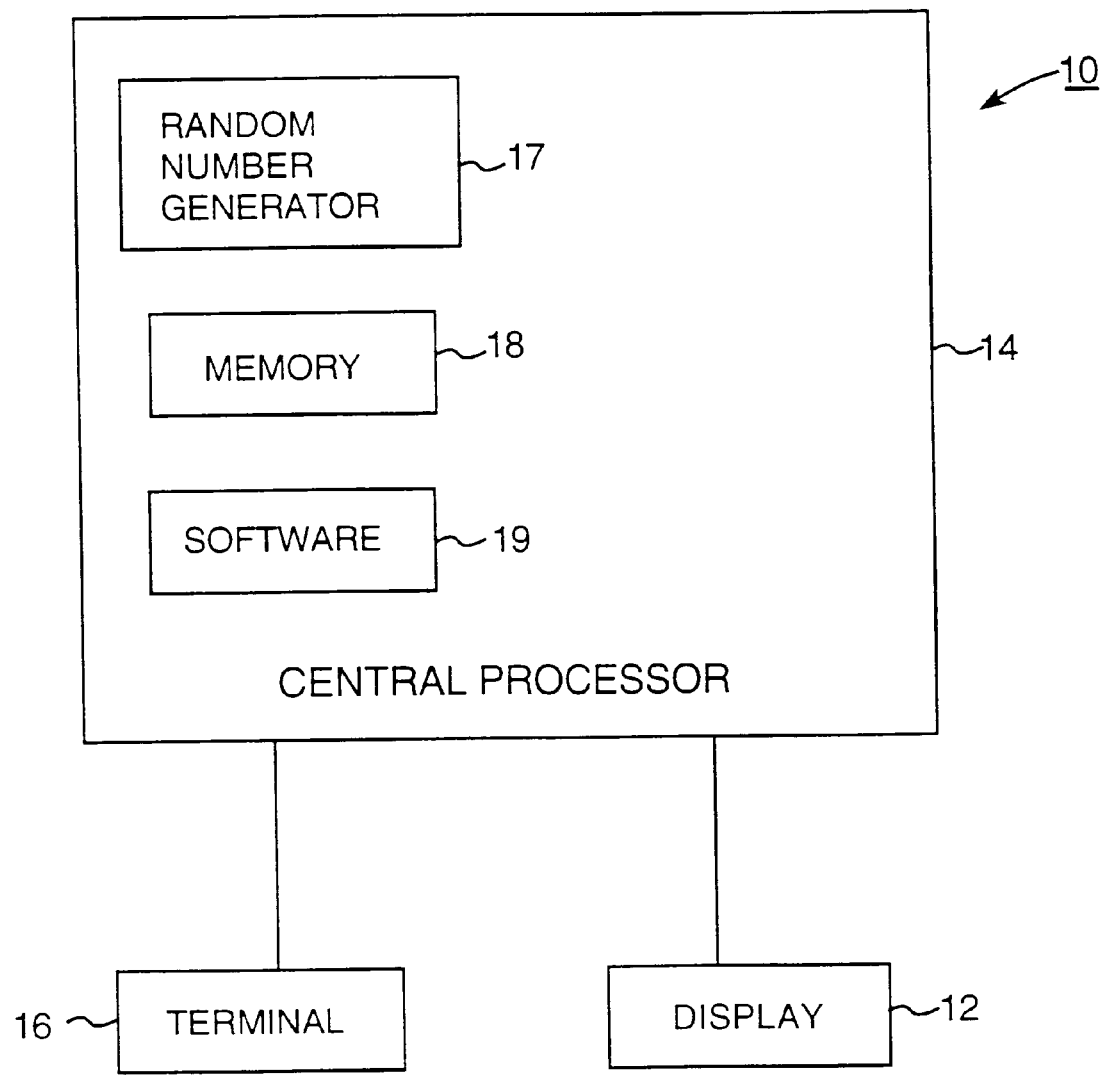
FIG. 1 diagrammatically shows a system for playing the game of chance of the present invention.

The game of chance of the present invention may be played using a variety of display media, e.g., a manual display or a video display. FIG. 1 shows an arrangement 10 for playing the game using a video display, in which a video display device 12 is driven by a central processor 14. Using arrangement 10, players may place wagers on games displayed on display 12 using one or more ticket terminals, such as terminal 16 which is in digital communication with central processor 14. Central processor 14 may be located near display 12 and terminal 16, e.g. in the same gaming establishment, or may be at a remote location.

The game of chance of the present invention is played with a predetermined number of game participants. For example, as shown on display 12 in FIG. 2, there may be five game participants in the form of racing cars 20 through 28. Each game participant may be associated with a distinct color for ease of distinguishing the game participants. Thus, the five cars 20 through 28 may be identified, e.g., by the colors white, red, green, blue and brown, respectively.

Figure 2:
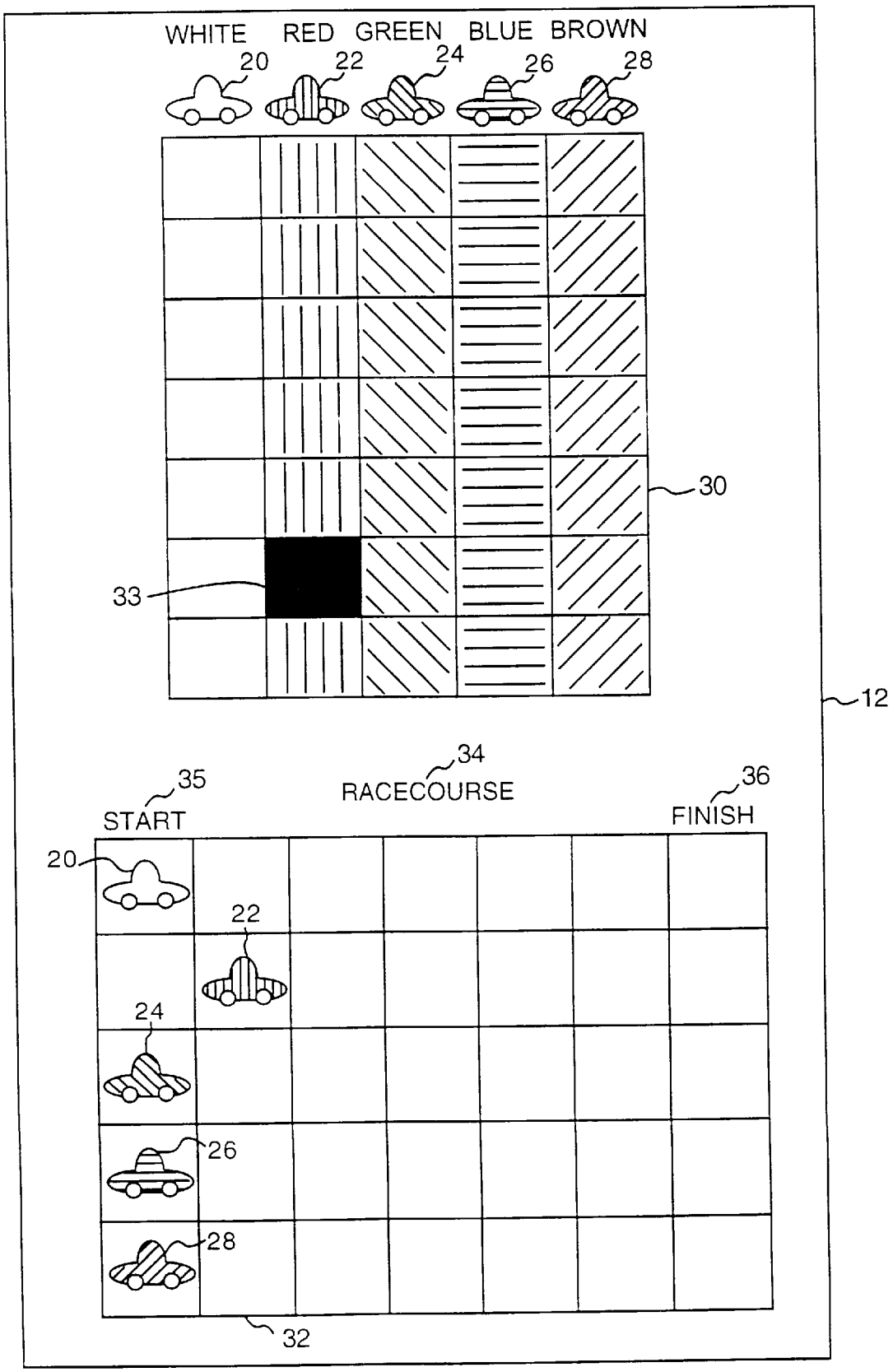
FIG. 2 is a display showing the game of chance of the present invention.

A set of drawing elements is associated with each game participant. The number of drawing elements for each of the game participants is the same. For example, as shown in FIG. 2, for each racing car 20 through 28 there may be seven drawing elements. The drawing elements are pictured on display 12, e.g., as colored blocks in the form of a grid 30. In the present example, there are seven blocks for each racing car 20 through 28, with all seven blocks having the same color as the racing car to which they correspond. Grid 30 contains 35 colored blocks in five single-color columns.

As shown in FIG. 2, to play the game of chance of the present invention, each game participant progresses one space 32 at a time along a course, e.g., a racecourse 34, from a start location 35 toward a termination point, i.e. a finish line 36. A game participant progresses one space 32 when one of its corresponding drawing elements is randomly selected from the total collection of available drawing elements. Each game participant must progress a sufficient quantity of spaces, e.g., the number of spaces in racecourse 34, to reach the termination point. In the present example, a racing car reaches finish line 36 when all seven of its corresponding drawing elements have been drawn.

During play of the game, a drawing element is randomly chosen from among the collection of remaining drawing elements. After a drawing element has been chosen, it is removed from the collection of available drawing elements. The random selection may be accomplished electronically by a random number generator 17 in central processor 14. A memory 18 in central processor 14 may store the collection of drawing elements corresponding to the game participants. Random number generator 17 may then be used to randomly select a drawing element from among those remaining in memory 18. Alternately, drawing elements may be chosen using a manual drawing device such as a ball drawing machine or drum.

In the example of FIG. 2, the game's players are notified as to which drawing element is randomly selected during a draw by removing the colored block 33 corresponding to the chosen drawing element from grid 30. Removed colored block 33 is pictured as a darkened space in FIG. 2. The racing car 22 corresponding to the chosen drawing element is then shown to progress one space 32 along racecourse 34 toward finish line 36.

When a game participant progresses one space toward the termination point because one of its corresponding drawing elements has been chosen, the probability that the same game participant will progress another space toward the termination point when the next drawing element is chosen decreases, since there is one fewer drawing element corresponding to that game participant available in the collection of drawing elements. In the example of FIG. 2, at the start of the game, the probability that each racing car will progress one space on the first draw is $1/5$ or $7/35$. If on the first draw drawing element 33 corresponding to red racing car 22 is chosen, the probability that a drawing element corresponding to red car 22 will be chosen on the second draw is $6/34$. However, the probability that a drawing element corresponding to one of the other racing cars 20, 24, 26, 28 will be chosen is $7/34$, which is greater than $6/34$.

The game's players do not know which game participant will be the first to reach the termination point until one of the game participants actually reaches it. Game participants that are farther from the finish line become more likely to progress toward the finish line, and game participants that are closer to the finish line become less likely to progress toward the finish line. Thus, the game is self-regulating in that if the drawing elements corresponding to a particular game participant are drawn a disproportionately large number of times, the probability that that game participant will progress toward the finish line on the next draw is proportionally reduced. This self-regulating nature causes the game to tend toward a competitive finish between the game participants, which heightens the players' excitement.

The game of chance of the present invention may be played to determine which game participant is the first to reach the termination point. The game may also be played to determine the finishing order of all of the game participants, thus permitting a more complex gaming structure.

Players place wagers on the outcome of the contest, i.e. the occurrence of events relating to the progress of the game participants. Such wagers may be, e.g., monetary bets. Players can place wagers on various combinations and permutations of occurrences in a single game or for multiple games played. FIG. 3 shows examples of the types of wagers that players may make for single and multiple games. Such a wagering scheme allows players to make wagers with a relatively high probability of winning, e.g., that a particular game participant will be the first to reach the termination point, as well as wagers with a relatively low probability of winning, e.g., that a particular game participant will be the first to reach the termination point for three consecutive games. It is contemplated that the payout for games having a high probability of winning will be relatively low, and that the payout for games having a low probability of winning will be relatively high.

Players may place wagers using various wagering techniques. For example, players may place wagers using a wide area point of sale terminal 16 from which ticket receipts are printed. Alternately, players may place wagers using wireless or hard-wired interactive wagering devices in a gaming establishment. Using either of these two wagering systems, the players' wagers are recorded in central processor 14 to ensure accurate and detailed recordation of each player's wagering activity.

Figure 4:
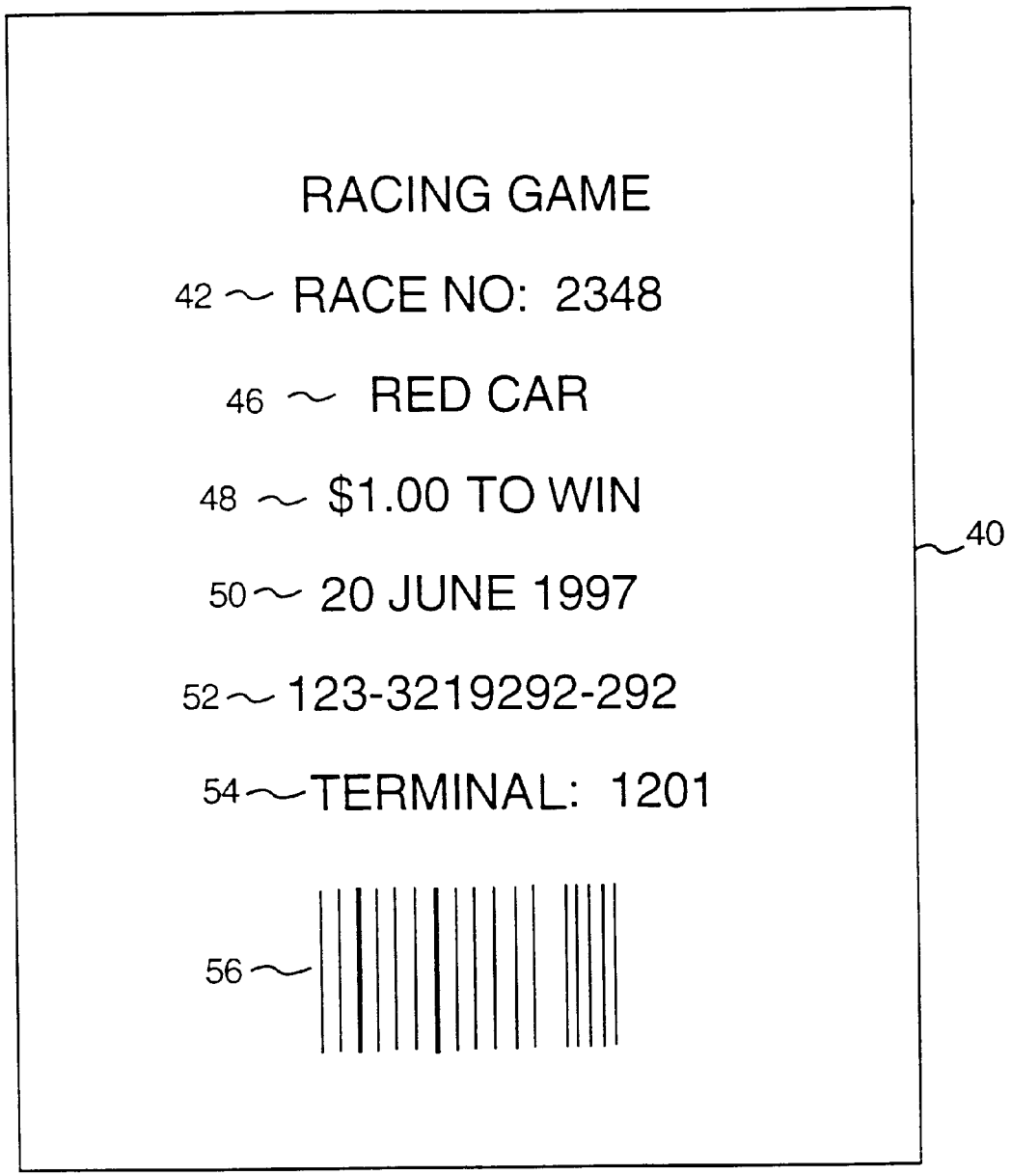
FIG. 4 shows a ticket for the game of chance of the present invention.

For example, as shown in FIG. 4, when a player places a wager at point of sale terminal 16 using such a wagering system, a ticket 40 is produced. Ticket 40 is printed with the particular game (i.e. contest or race) 42, the combination of game participants for which the wager is placed 46, the amount of the wager 48, the date of the wager 50, a ticket serial number 52, and a machine readable bar code 56 representing the ticket serial number 52 and an identifier 54 of the point of sale terminal 16 from which ticket 40 issued.

Players can place wagers at any time during play of the game. However, the odds of a particular game participant reaching the termination point in a certain order and in a certain number of draws changes with each draw from the collection of drawing elements. Thus, the payout for a wager depends on the status of the game participants at the time the wager is placed. Since the payout for each wager is affected by the status of the game at the time the wager is made, central processor 14 records each wager along with the game status in memory 18.

Software 19 in central processor 14 may be used, e.g., to determine the odds of each game participant finishing first, second or third, and the odds that each game participant will finish within a specified number of draws. These odds may be updated after each drawing element is drawn. The odds calculated by software 19 may be displayed to the players on display 12 so that the players can decide when during the game they would like to place wagers. For example, as shown in FIG. 5, at the time display 12 is shown, i.e. after five draws, the payout for the red car 22 reaching finish line 36 first in from 11 to 14 drawings is $100 for a $1 bet.

Since the game of chance of the present invention may be played for more than one wager type, play of the game continues until sufficient game participants have reached the termination point for all allowable wager types. For example, if wagers may be placed for win, place and show, e.g., first, second and third place racing cars to reach finish line 36, draws must be made until three racing cars have reached finish line 36 before the game is concluded. At the conclusion of the game, payouts are awarded to the game's players based on the amounts of the wagers and the status of the game participants when the wagers were made.

Figure 6:
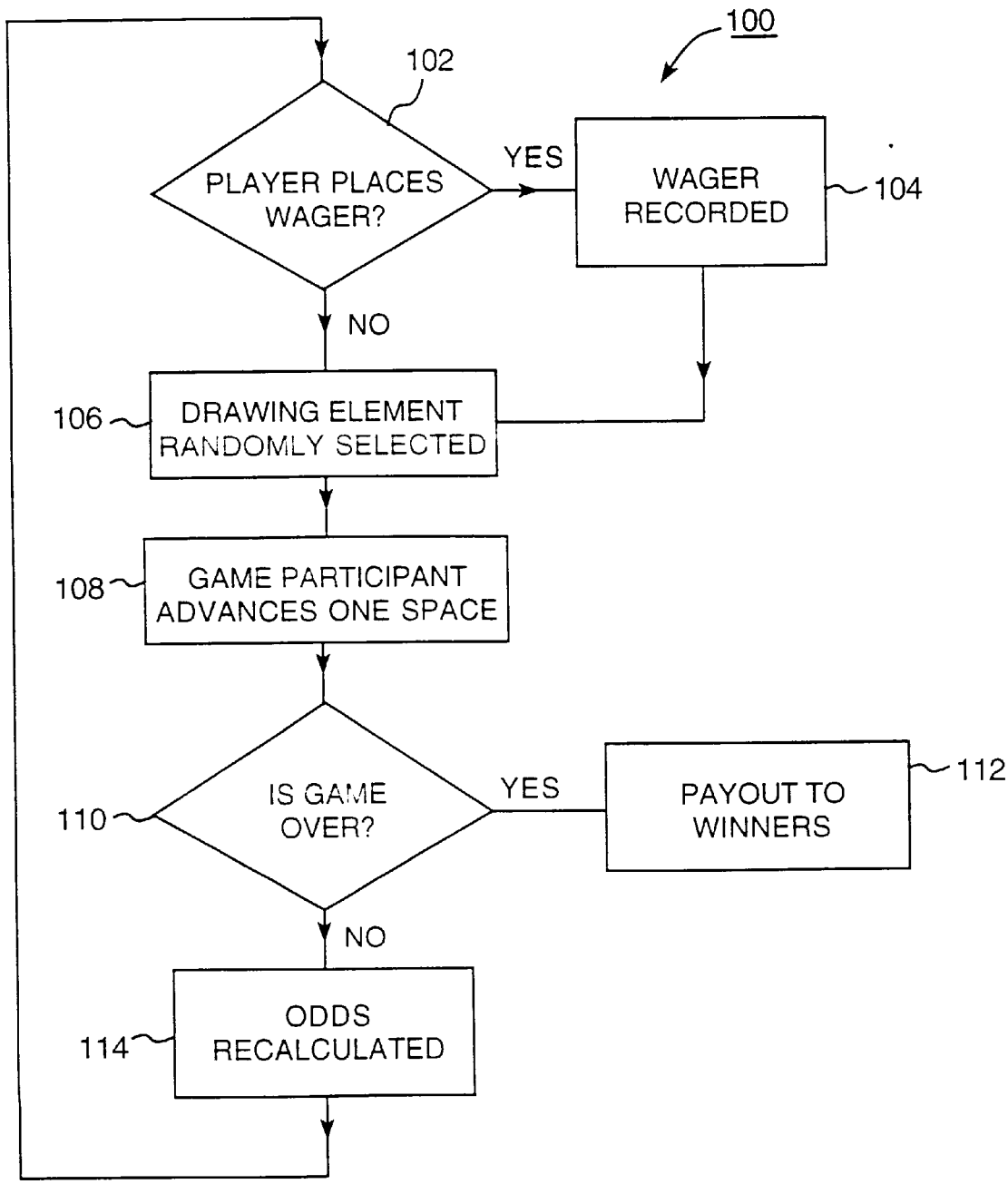
FIG. 6 is a flow chart showing a method of playing the game of chance of the present invention.

A method 100 of playing the game of chance of the present invention is shown in FIG. 6. At the start of the game, a player may place a wager (step 102). If the player places a wager, the wager is recorded in memory 18 of central processor 14 (step 104). Whether or not the player places a wager, a drawing element is drawn from the collection of drawing elements (step 106). The game participant that corresponds to the chosen drawing element is then advanced one space (step 108).

After each draw, central processor 14 determines if the game is over, i.e. whether the necessary number of game participants has reached the termination point for all available wagering options (step 110). If the game is over, payouts are made to the players (step 112).

If the game is not over, software 19 in central processor 14 recalculates the odds concerning the remaining game participants reaching the termination point (step 114). The game then proceeds with step 102, where the player can place a wager prior to the next draw of a drawing element.

Due to the indeterminate end point of the game and the indeterminate number of draws required to produce a winning player, each player has a chance of being a winner until the winning players are actually determined. Since the players do not know exactly when the game will end, the players' level of excitement and anticipation increases as more activity has occurred without a conclusion to the game. As the number of draws increases, an increasing number of game participants are likely to approach the termination point, increasing the excitement of the players.

In the game of chance of the present invention, no player is excluded from winning the top prize until the winning game participant or participants are determined. Since there are an indeterminate number of draws required to produce a winner or winners to the game, there is a probability greater than zero that each player will be a winner until such time as the winning game participants are actually determined.

The game of chance of the present invention appears to be an interactive game from the players' point of view. Each game involves drawing many drawing elements corresponding to a number of game participants. In most instances, all of the game participants will have advanced at least some of the way toward the termination point prior to the conclusion of the game. Players may feel that they are competing against each other, even though the progress of the game participants is actually determined randomly. Moreover, the game of chance of the present invention is simple to play, based on known and understandable events. Players need only guess the outcome of the contest, e.g., the first racing car to reach finish line 36, in order to place wagers.

The game of the present invention is applicable to a wide variety of playing environments, including traditional on-line lotteries with daily drawings, on-line lotteries with drawings at short intervals in a social environment, video lottery personal playstations, casino-oriented games in a social environment, pay-to-play games in a social environment, and free promotional games for prizes in a social environment.

Other embodiments are within the scope of the following claims.

What is claimed is:

1. A game of chance comprising:

a plurality of distinct racing game participants;

a plurality of drawing elements corresponding to each one of the game participants, the plurality of drawing elements being equal in number for each one of the game participants;

a selection device for randomly selecting drawing elements from among all of the plurality of drawing elements corresponding to all of the plurality of game participants one at a time during the game, each drawing element selectable only once during the game; and a termination point toward which a game participant progresses when one of the plurality of drawing elements corresponding to the game participant is selected by the selection device;

wherein the game participant reaches the termination point when a sufficient quantity of the plurality of drawing elements corresponding to the game participant has been selected.

2. The game of chance of claim 1 wherein the probability that each game participant will progress toward the termination point as a result of a next random selection of one of the drawing elements changes each time one of the drawing elements is randomly selected by the selection device.

3. The game of chance of claim 1 wherein the selection device is a random number generator.

4. The game of chance of claim 1 wherein the selection device is a manual drawing device.

5. The game of chance of claim 1 further comprising a video display for displaying the game participants and the drawing elements.

6. The game of chance of claim 5 wherein the video display displays the progress of the game participants toward the termination point during play of the game.

7. The game of chance of claim 1 wherein each game participant and the plurality of drawing elements corresponding to each game participant are identified by a color, the color for each game participant being distinct.

8. The game of chance of claim 1 wherein the game participants are distinguished by color.

9. The game of chance of claim 1 wherein the game participants are racing cars.

10. A method of playing a game of chance comprising:

providing a plurality of distinct racing game participants;

providing a plurality of drawing elements corresponding to each one of the game participants, the plurality of drawing elements being equal in number for each one of equal participants;

randomly selecting a drawing element from among all of the plurality of drawing elements for all of the plurality of game participants one at a time during the game, each drawing element selectable only once during the game; and advancing a game participant toward a termination point when one of the plurality of drawing elements corresponding to the game participant is selected;

wherein the game participant reaches the termination point when a sufficient quantity of the plurality of drawing elements corresponding to the game participant has been selected.

11. The method of claim 10 further comprising calculating and displaying the probability that each game participant will progress toward the termination point as a result of a next random selection of one of the drawing elements.

12. The method of claim 10 further comprising placing a wager with respect to the progress of one or more game participants toward the termination point.

13. The method of claim 12 wherein the wager is placed at any time during play of the game.

14. The method of claim 12 wherein a payout for the wager is based on the probability that a particular game participant will reach termination point before other game participants.

15. The method of claim 12 wherein a payout for the wager is based on the probability that the game participants will reach the termination point in a particular order.

16. The method of claim 12 wherein a payout for the wager is based on the probability that a particular game participant will reach the termination point before a predetermined number of drawing elements has been randomly selected.

17. A system for playing a game of chance, comprising:

a processor for conducting play of the game, in which a plurality of distinct racing game participants advance toward a termination point;

a memory for storing a plurality of drawing elements corresponding to each one of the plurality of game participants, the plurality of drawing elements being the same in number for each one of equal participants;

a random number generator for randomly selecting drawing elements stored in the memory one at a time during play of the game, each drawing element selectable only once during the game; and a display device for displaying the game participants as they advance toward the termination point, each game participant advancing toward the termination point when one of the plurality of drawing elements corresponding to the game participant is selected by the random number generator;

wherein a game participant reaches the termination point when a sufficient quantity of the plurality of drawing elements corresponding to the game participant has been selected.

18. The system of claim 17 wherein the processor calculates and the display device displays the probability that each game participant will progress toward the termination point as a result of a next random selection by the random number generator.

19. The system of claim 17 further comprising a terminal in communication with the processor for placing wagers on the game.

20. The system of claim 17 wherein the display device displays payouts associated with the wagers.

21. The system of claim 17 wherein the display device displays the game participants and the drawing elements.

22. The system of claim 21 wherein the drawing elements are displayed as colored blocks in a grid.

23. A game of chance comprising:

a plurality of distinct racing game participants;

a plurality of drawing elements corresponding to each one of the game participants;

a selection device for randomly selecting drawing elements from among all of the plurality of drawing elements corresponding to all of the plurality of game participants one at a time during the game, each drawing element selectable only once during the game; and a termination point toward which a game participant progresses when any one of the plurality of drawing elements corresponding to the game participant is selected by the selection device;

wherein the game participant reaches the termination point when a sufficient quantity of the plurality of drawing elements corresponding to the game participant has been selected.

* * * * *